United States Patent [19]

Johnson

[11] Patent Number: 5,765,917
[45] Date of Patent: Jun. 16, 1998

[54] BACKREST FOR AN ATV

[76] Inventor: Dee M. Johnson, 350 W. 400 North, Richfield, Utah 84701

[21] Appl. No.: 730,307

[22] Filed: Oct. 11, 1996

[51] Int. Cl.⁶ .................................................. A47C 15/00
[52] U.S. Cl. .................................. 297/352; 297/440.24
[58] Field of Search .............................. 297/352, 383, 297/440.1, 230.1, 230.12, 230.14, 440.24, 440.2

[56] References Cited

U.S. PATENT DOCUMENTS 5,314,239  5/1994  Edwards et al. ...................... 297/352

*Primary Examiner*—Milton Nelson, Jr.
*Attorney, Agent, or Firm*—Terry M. Crellin

[57] ABSTRACT

A backrest for an ATV which is quickly and easily installed on and removed from a carrier rack of the ATV without requiring any modification to the carrier rack or any other portion of the ATV. Three elongate, substantially flat bars are welded together in end-to-end fashion to form a U-shaped member, and the U-shaped member is releasably attached to the carrier rack of the ATV, with the lower, broad, flat surfaces of the U-shaped member lying flatwise on the upper surface of the carrier rack. An upstanding back cushion is secured to the U-shaped member so that the back cushion can be positioned at selected positions relative to the seat of the ATV.

12 Claims, 1 Drawing Sheet

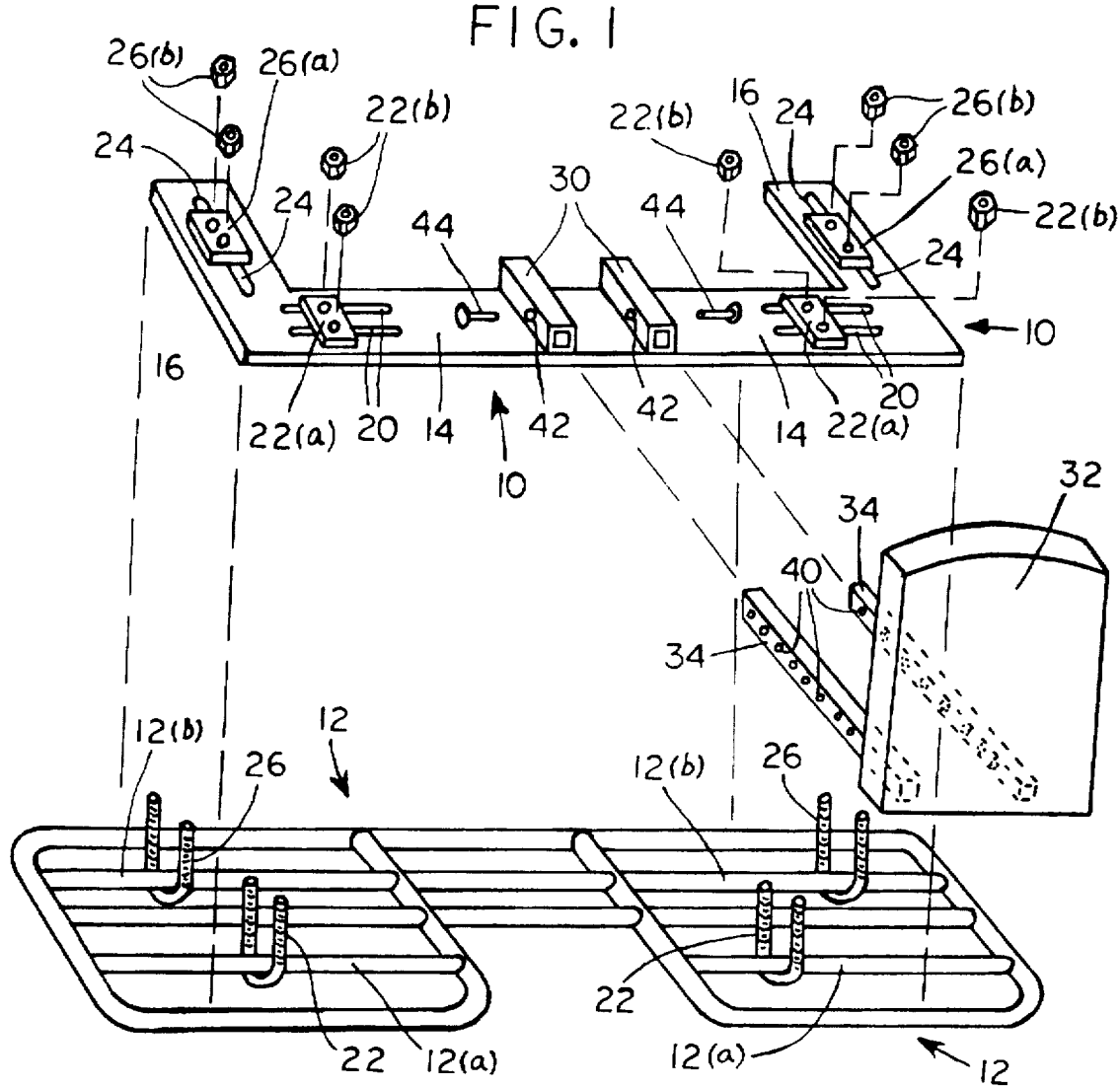
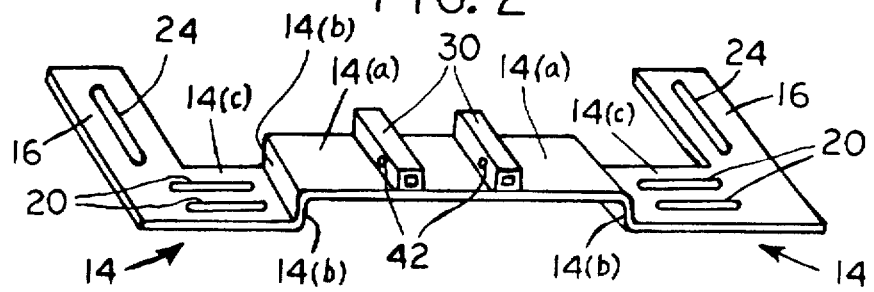

5,765,917

1

BACKREST FOR AN ATV

BACKGROUND OF THE INVENTION

1. Field of the Invention

The present invention relates to backrest apparatus used on an ATV (all terrain vehicle). In particular, the present invention relates to a backrest that is quickly and easily installed on and removed from a carrier rack of an ATV without requiring any modification to the carrier rack or any other portion of the ATV.

2. State of the Art

All terrain vehicles are used generally off paved roads wherein the terrain is relatively rough so as to generate relatively rough riding conditions. It has been recognized that it would be desirable to provide a backrest for an ATV as a safety measure to minimize injury as well as to assist in comfort while riding the ATV.

The unique construction of an all terrain vehicle universally includes a carrier rack positioned immediately behind the seat of the vehicle. It has been proposed to attach a backrest to the carrier rack. For example, see U.S. Pat. No. 5,314,239 wherein structure is provided for mounting a backrest to the carrier rack. As taught in U.S. Pat. No. 5,314,239, two mounting tubes must be permanently attached to the upper surface of the carrier rack. This requires a permanent modification of the carrier rack, and even when the backrest is removed, the mounting tubes remain as a permanent alteration of the carrier rack. It is highly desirable to provide a strong and sturdy backrest for an ATV which can easily and readily be attached to and removed from the carrier rack of the ATV without requiring any modification to the carrier rack or any other portion of the ATV.

OBJECTIVES AND BRIEF DESCRIPTION OF THE INVENTION

The principal objective of the invention is to provide a novel backrest for an ATV which is quickly and easily installed on and removed from a carrier rack of the ATV without requiring any modification to the carrier rack or any other portion of the ATV.

In accordance with the present invention, a backrest is provided having a broad, substantially flat base member that lies substantially flatwise on the upper surface of the carrier rack. An upstanding back cushion extends upwardly from the flat base member, and novel means that will be described fully hereinafter are provide for securing the back cushion to the flat base member so that the back cushion can be adjusted to various fore and aft positions relative to the flat base member. A plurality of clamp members are provided that firmly secure the flat base member to the carrier rack without requiring any modification to the carrier rack or any other portion of the ATV. The backrest of the present invention can be removed from the ATV by removing the clamp members so as to free the flat base member. The flat base member and clamps are removed so as to leave the carrier rack of the ATV in its original condition with no indication that the backrest device had previously been installed on the carrier rack.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which:

2

FIG. 1 is a pictorial representation of a carrier rack of an ATV with the backrest of the present invention shown in exploded relationship to the carrier rack; and FIG. 2 is a pictorial representation of a modified embodiment of the base portion of the backrest that attaches to the carrier rack.

DETAILED DESCRIPTION OF THE ILLUSTRATED EMBODIMENTS

In accordance with the present invention, a backrest is provided for an ATV wherein the backrest is quickly and easily installed on and removed from a carrier rack of the ATV without requiring any modification to the carrier rack or any other portion of the ATV. As illustrated in the drawings, the backrest 10 comprises three elongate, substantially flat bars 14 and 16 that are welded together in end-to-end fashion to form a U-shaped member. The first bar 14 forms a base of the U-shaped member and second and third bars 16 form legs of the U-shaped member, with the second and third bars 16 extending from opposite ends of the first bar 14 so that upper and lower, broad, flat surfaces of the second and third bars 16 are substantially coplanar with each other as well as coplanar with the upper and lower, broad, flat surfaces of respective ends of the first bar 14.

The U-shaped member is releasably attached to the carrier rack 12 of the ATV, with the lower, broad, flat surfaces of the respective ends of the first bar 14 and the lower, broad, flat surfaces of the second and third bars 16 lying flatwise on the upper surface of the carrier rack 12 of the ATV.

The means for releasably attaching the U-shaped member to the carrier rack 12 comprises a pair of spaced apart, elongate, parallel slots 20 in each of the opposite ends of the first bar 14. Each of the pair of parallel slots 20 extend longitudinally along the opposite end portions of the first bar 14. A pair of first U-bolts 22 are provided, one for each pair of parallel slots 20 in the respective ends of the first bar 14. Each of the first U-bolts 22 extending upwardly around a cross member 12(a) of the carrier rack 12 and through a respective pair of parallel slots 20 in the first bar 14. A clamp bar 22(a) has two openings therein that are spaced apart so that the extending ends of the U-bolts 22 can be received through the openings in the clamp bar 22(a). Nuts 22(b) can then be tightened down on the respective ends of the U-bolts 22 to securely clamp the first bar 14 to the cross member 12(a) of the carrier rack 12.

An elongate slot 24 is provided in each of the second and third bars 16. Each elongate slot 24 in the second and third bars 16 extends longitudinally along a respective second or third bar 16. A second U-bolt 26 is provided for each elongate slot 24 in the second and third bars 16. Each second U-bolt 26 extends upwardly around a respective cross member 12(b) of the carrier rack 12 and through an elongate slot 24 in a respective first and second bar 16. A clamp bar 26(a) has two openings therein that are spaced apart so that the extending ends of the U-bolts 26 can be received through the openings in the clamp bar 26(a). Nuts 26(b) can then be tightened down on the respective ends of the U-bolts 22 to securely clamp the second and third bars 16 to the respective cross members 12(b) of the carrier rack 12.

Two attachment brackets 30 are attached to the first flat bar 14 of the U-shaped member. The brackets 30 are spaced apart from each other and extend substantially perpendicularly upwardly from the first flat bar 14. In a preferred embodiment as illustrated in the drawings, each of the two attachment brackets 30 comprises an elongate, rectangular, tube that is attached securely to the first bar 14, with the tube being oriented substantially perpendicular to a longitudinal axis of the first bar 14.

An upstanding back cushion 32 has two elongate attachment members 34 that extend backwardly from a lower rearward side of the back cushion 32. Each of the elongate attachment members 34 make sliding engagement with a respective attachment bracket 30 so that each of the elongate attachment members 34 can slide longitudinally back and forth along a respective attachment bracket 30. In the preferred embodiment shown in the drawings, each elongate attachment member 34 comprises an elongate, rectangular, tube that is adapted to be received telescopically within a respective tube that forms the attachment bracket 30. The tube forming the attachment member 34 is thus adapted for sliding longitudinal movement within the tube that forms the attachment bracket 30.

Means are provided for releasably securing each of the elongate attachment members 34 to a respective attachment bracket 30 at selectable positions along the longitudinal length of the elongate attachment member 34. Preferably, the means for securing each of the attachment members 34 to a respective attachment bracket 30 comprises a plurality of spaced apart openings 40 that extend through each of the tubes forming the attachment members 34. Another opening 42 is provided through each of the tubes forming the attachment brackets 30. The opening 42 in each respective attachment bracket 30 is adapted to register successively with the plurality of openings 40 in a respective attachment member 34 when the attachment member 34 tube moves longitudinally within the respective attachment bracket 30. A removable pin 44 extends through registered openings in the respective attachment members 34 and attachment brackets 30.

On some all terrain vehicles, the back end of the seat is elevated sightly above the upper surface of the carrier rack. For those vehicles, it is advantageous to modify the U-shaped member of the present invention so that the first bar 14 of the U-shaped member can bridge over the back end of the seat. In this modified embodiment, as illustrated in FIG. 2, the first bar 14 of the U-shaped member comprises an elongate, flat, intermediate portion 14(a) that has two relatively short, flat legs 14(b) extending downwardly from opposite ends of the intermediate portion 14(a). Two elongate, flat base members 14(c) extend outwardly in diametrically opposite directions from the downwardly extending ends of the legs 14(b). It is advantageous to form the U-shaped member of FIG. 2 from a single piece of substantially flat bar stock by bending opposite end portions of the bar first downwardly for a relatively short distance to form the legs 14(b) and then bending the end portions diametrically outwardly away from each other to form the base members 14(c).

Although preferred embodiments of backrest apparatus of the present invention have been illustrated and described, it is to be understood that the present disclosure is made by way of example and that various other embodiments are possible without departing from the subject matter coming within the scope of the following claims, which subject matter is regarded as the invention.

I claim:

1. A backrest for an ATV wherein said backrest is quickly and easily installed on and removed from a carrier rack of the ATV without requiring any modification to the carrier rack or any other portion of the ATV, said backrest comprising three elongate, substantially flat bars that are welded together in end-to-end fashion to form a U-shaped member in which a first bar forms a base of said U-shaped member and second and third bars form legs of said U-shaped member, with said second and third bars extending from opposite ends of said first bar, so that upper and lower, broad, flat surfaces of said second and third bars are substantially coplanar with each other as well as coplanar with upper and lower, broad, flat surfaces of respective ends of said first bar;

means for releasably attaching said U-shaped member to said carrier rack of said ATV, with the lower, broad, flat surfaces of the respective ends of said first bar and the lower, broad, flat surfaces of said second and third bars lying flatwise on said carrier rack of said ATV;

two attachment brackets attached to said first flat bar of said U-shaped member, said brackets being spaced apart from each other and extending substantially perpendicularly upwardly from said first flat bar;

an upstanding back cushion having two elongate attachment members extending backwardly from a lower rearward side of said back cushion, with each of said elongate attachment members making sliding engagement with a respective attachment bracket so that each of said elongate attachment members can slide longitudinally back and forth along a respective attachment bracket; and means for releasably securing each of said elongate attachment members to a respective attachment bracket at selectable positions along the longitudinal length of said elongate attachment member.

2. A backrest in accordance with claim 1 wherein said first bar comprises an elongate, flat, intermediate portion;

two relatively short, flat legs extending downwardly from opposite ends of said intermediate portion; and two elongate, flat base members extending outwardly in opposite directions from downwardly extending ends of said legs.

3. A backrest in accordance with claim 2 wherein said first bar is formed from a single piece of substantially flat bar stock by bending opposite end portions of the bar first downwardly for a relatively short distance to form said legs, and then bending the end portions diametrically outwardly away from each other to form said base members.

4. A backrest in accordance with claim 1 wherein said means for releasably attaching the U-shaped member to said carrier rack comprises a pair of spaced apart, elongate, parallel slots in each of the opposite ends of said first bar, each of said pair of parallel slots extending longitudinally along said first bar;

a pair of first U-bolt clamps, one for each pair of parallel slots in the respective ends of said first bar, with each of said first U-bolt clamps being adapted to encircle a cross member of the carrier rack and extend upwardly through a respective pair of parallel slots to securely clamp said first bar to said cross member;

an elongate slot in each of said second and third bars, each elongate slot in said second and third bars extending longitudinally along respective second and third bars; and a second U-bolt clamp for each elongate slot in said second and third bars, with each said second U-bolt clamp being adapted to encircle another cross member of the carrier rack and extend upwardly through an elongate slot in a respective second and third bar to securely clamp said second and third bars to said another cross member.

5. A backrest in accordance with claim 1 wherein each of said two attachment brackets comprises an elongate, rectangular, first tube attached securely to said first bar, with said first tube being oriented substantially perpendicular to a longitudinal axis of said first bar; and each elongate attachment member comprises an elongate, rectangular, second tube that is adapted to be received telescopically within a respective first tube for sliding longitudinal movement within said first tube.

6. A backrest in accordance with claim 5 wherein said means for securing each of said attachment members to a respective attachment bracket comprises a plurality of spaced apart openings through each of said second tubes;

an opening through each of said first tubes, said opening in each respective first tube being adapted to register successively with the plurality of openings in a respective second tube when the second tube moves longitudinally within the respective first tube; and a removable pin that extends through registered openings in said respective first and second tubes.

7. A backrest for an ATV wherein said backrest is quickly and easily installed on and removed from a carrier rack of the ATV without requiring any modification to the carrier rack or any other portion of the ATV, said backrest comprising an elongate, substantially flat bar;

means for releasably attaching said flat bar to said carrier rack of said ATV, with lower, broad, flat surfaces of at least respective ends of said flat bar lying flatwise on said carrier rack of said ATV;

two attachment brackets attached to said flat bar, said brackets being spaced apart from each other and extending substantially perpendicularly upwardly from said flat bar;

an upstanding back cushion having two elongate attachment members extending backwardly from a lower rearward side of said back cushion, with each of said elongate attachment members making sliding engagement with a respective attachment bracket so that each of said elongate attachment members can slide longitudinally back and forth along a respective attachment bracket; and means for releasably securing each of said elongate attachment members to a respective attachment bracket at selectable positions along the longitudinal length of said elongate attachment member.

8. A backrest in accordance with claim 7 wherein said flat bar comprises an elongate, flat, intermediate portion;

two relatively short, flat legs extending downwardly from opposite ends of said intermediate portion; and two elongate, flat base members extending outwardly in opposite directions from downwardly extending ends of said legs.

9. A backrest in accordance with claim 8 wherein said flat bar is formed from a single piece of substantially flat bar stock by bending opposite end portions of the bar stock first downwardly for a relatively short distance to form said legs, and then bending the end portions of the bar stock diametrically outwardly away from each other to form said base members.

10. A backrest in accordance with claim 8 wherein said means for releasably attaching said flat bar to said carrier rack comprises a pair of spaced apart, elongate, parallel slots in each of the opposite ends of said flat bar, each of said pair of parallel slots extending longitudinally along said flat bar; and a pair of U-bolt clamps, one for each pair of parallel slots in the respective ends of said flat bar, with each of said U-bolt clamps being adapted to encircle a cross member of the carrier rack and extend upwardly through a respective pair of parallel slots to securely clamp said flat bar to said cross member.

11. A backrest in accordance with claim 8 wherein each of said two attachment brackets comprise elongate, rectangular, first tubes attached securely to said flat bar, with said first tubes being oriented substantially perpendicular to a longitudinal axis of said flat bar; and each elongate attachment member comprises an elongate, rectangular, second tube that is adapted to be received telescopically within a respective first tube for sliding longitudinal movement within said first tube.

12. A backrest in accordance with claim 11 wherein said means for securing each of said attachment members to a respective attachment bracket comprises a plurality of spaced apart openings through each of said second tubes;

an opening through each of said first tubes, said opening in each respective first tube being adapted to register successively with the plurality of openings in a respective second tube when the second tube moves longitudinally within the respective first tube; and a removable pin that extends through registered openings in said respective first and second tubes.

* * * * *